United States Patent

[11] 3,627,803

[72] Inventor Keith W. Michael
 Midland, Mich.
[21] Appl. No. 873,519
[22] Filed Nov. 3, 1969
[45] Patented Dec. 14, 1971
[73] Assignee Dow Corning Corporation
 Midland, Mich.

[54] HIGH TEMPERATURE METHOD OF PREPARING ORGANOSILICON HYDRIDE COMPOUNDS
 6 Claims, No Drawings
[52] U.S. Cl. .................................................. 260/448.2E,
 260/448.2 H, 260/448.8 R
[51] Int. Cl. ....................................................... C07f 7/02,
 C07f 7/04
[50] Field of Search ........................................... 260/448.2,
 448.2 H, 448.2 E, 448.8

[56] References Cited
 UNITED STATES PATENTS
2,857,414 10/1958 Schmidt et al. ............... 260/448.2

Primary Examiner—Tobias E. Levow
Assistant Examiner—Werten F. W. Bellamy
Attorneys—Robert F. Fleming, Jr., Laurence R. Hobey, Harry D. Dingman and Howard W. Hermann ABSTRACT: Aluminum alkyls are reacted with halo and/or alkoxysilanes at 300° C. or above to give silanes containing SiH groups without alkylation of the silicon. For example, a mixture of triethyl aluminum and dimethyldichlorosilane was heated in a tube at 450° C. for less than one second to give dimethylchlorosilane and dimethylsilane without the formation of ethylsilicon bonds.

HIGH TEMPERATURE METHOD OF PREPARING ORGANOSILICON HYDRIDE COMPOUNDS

Silanes containing SiH bonds are valuable commercial chemicals both for use per se, as for example, as water repellents, and as intermediates in the preparation of other silanes and siloxanes. The art is replete with uses for these materials.

It is known from U.S. Pat. No. 2,857,414 that aluminum alkyls, both trialkyls and dialkyl aluminum hydrides will react with halo and alkoxysilanes to produce SiH compounds. This patent teaches carrying out the reaction at from 20° to 260° C. It further shows in examples 2 and 3 that the reaction of dialkylaluminum hydride with halosilanes at room temperature gives a reduction of the silane without alkylation of the silicon. However, it teaches in examples 1 and 4 that when either dialkyl aluminum hydrides or trialkyl aluminum compounds are reacted with halosilanes at temperatures of 200° to 260° C. some reduction of the silicon occurs, but there is also obtained extensive alkylation of the silicon compounds with the formation of alkyl silicon bonds. Thus, the general teaching of this patent is that whereas alkylation does not occur at lower temperatures, extensive alkylation occurs as the temperature is raised.

Applicant has found most unexpectedly, however, that at temperatures of 300° C. and above one can reduce halo or alkoxy silanes with either trialkyl aluminum compounds or dialkyl aluminum hydrides without alkylation of the silicon and further that the efficiency of the process with respect to the formation of SiH increases as the temperature rises.

This invention relates to the method comprising heating a mixture of $R_nSiX_{4-n}$ and $R'_{3-z-m}AlH_zY_m$ at a temperature of at least 300° C. and removing the reaction product from the heated zone before substantial decomposition of the desired products are obtained, whereby reduction of at least one of the X groups occurs without alkylation of the silicon to give silanes of the formula $R_nSiH_bX_{4-n-b}$ in which R is a hydrocarbon radical of less than 10 carbon atoms, X is halogen or an alkoxy radical of less than 10 carbon atoms, R' is a lower alkyl radical of at least two carbon atoms, Y is halogen or a lower alkoxy radical, $n$ is an integer from 1 to 3, $z$ is an integer from 0 to 1, $m$ is an integer from 0 to 2 and $b$ is an integer from 1 to 3, the sum of $n+b$ being not greater than 4.

The best method of carrying out the reaction of this invention is to add a mixture of the silane and the aluminum alkyl to a heated zone at substantially atmospheric pressure and then removing the reaction products from the heated zone as soon as possible. In general, it has been found that put through times of 1 second or less are sufficient to carry out this invention. It should be understood that the pressure of the reaction and reaction times are critical only with respect to decomposition of the products. Hence, no exact numerical limitations are meaningful with respect to the reaction time or pressure.

The lower temperature limit, however, is critical since the reaction of this invention does not occur in the desired manner at temperatures below 300° C. The upper temperature is not critical since the efficiency of the reaction increases, in general, as the temperature increases. Obviously, the temperature should be below that at which extensive decomposition of the products occur. It has been found that reaction temperatures from 300° to 800° C. or above are sufficient. Obviously, as the temperature rises the put through rate of the silane can be increased in order to prevent extensive decomposition.

If desired, the unreacted silanes can be recirculated through the reaction zone in order to increase the yield of the desired product.

If desired, inert solvents can also be employed in this invention. The most desirable solvents are hydrocarbons such as benzene, hexane, toluene, xylene, cyclohexane and decane.

The method of adding the ingredients to the heated zone is not critical, although it is obviously desirable to bring the reactants to the temperature of 300° C. or above as soon as possible. This can be accomplished by passing the reactants or solutions thereof into a zone which has been preheated to the desired temperature. In this manner the reactants come to reaction temperature almost instantly.

For the purpose of this invention R can be any hydrocarbon radical of less than 10 carbon atoms, such as alkyl radicals, such as methyl, ethyl, isopropyl, butyl or octyl; alkenyl radicals such as vinyl, allyl, or hexenyl; cycloaliphatic radicals such as cyclopentyl, cyclohexyl or cyclohexenyl; aromatic hydrocarbon radicals such as phenyl, tolyl or xylyl; and aralkyl hydrocarbon radicals such as benzyl, beta-phenylethyl or beta-phenylpropyl.

X can be any halogen atom such as fluorine, chlorine, bromine or iodine; or any alkoxy radical of less than 10 carbon atoms such as methoxy, ethoxy, octyloxy, isopropoxy or beta-methoxyethoxy. Obviously there can be both halogen and alkoxy groups attached to the same silicon atom.

R' is any lower alkyl radical such as ethyl, butyl, isobutyl, isopropyl or octyl; and Y is any halogen such as fluorine, chlorine, bromine or iodine or any lower alkoxy radical such as methoxy, isopropoxy, butoxy or octyloxy.

The following examples are illustrative only and should not be construed as limiting the invention which is properly delineated in the appended claims.

Example 1

A mixture of diisobutyl aluminum hydride and dimethyldichlorosilane in the mol ratio of 1 to 3 respectively was added to a heated tube at the temperatures shown in the table below. The effluent from the tube was analyzed by vapor phase chromatography and was found to contain the products in the mol ratios shown in the table below. No alkylation of the silicon with isobutyl groups was found by vapor phase chromatography.

| Temperature, °C. | Dimethyldichlorosilane (unreacted), mols | Dimethylchlorosilane, mols | Dimethylsilane, mols | Yield of SiH, mols |
|---|---|---|---|---|
| 330 | 1.6 | 0.5 | 0.9 | 1.9 |
| 350 | 1.5 | 0.4 | 1.0 | 2.4 |
| 370 | 1.4 | 0.5 | 1.2 | 2.9 |
| 410 | 1.3 | 0.5 | 1.2 | 2.9 |
| 450 | 1.1 | 0.5 | 1.3 | 3.1 |

This run shows the increasing efficiency of the reaction with respect to the production of SiH bonds as the temperature increases. It also shows that more than one SiH bond (up to 3) is produced per mol of aluminum hydride employed. Thus, this reaction is far more efficient than the room temperature reaction of diisobutyl aluminum hydride with chlorosilanes which gives only 1 mol of SiH per mol of dibutyl aluminum hydride employed.

Example 2

A mixture of triethyl aluminum* (*In the form of a 1.5 molar solution in cyclohexane.) and dimethyldichlorosilane in the mol ratio of 1.5 to 4.5 respectively were reacted at the temperature shown in the table below. In each case the mixture was in the reaction zone for less than 1 second.

| Temperature, °C. | Dimethyldichlorosilane, mols | Dimethylchlorosilane, mols | Dimethylsilane, mols |
|---|---|---|---|
| 450 | 4.05 | 0.33 | 0.12 |
| 475 | 3.86 | 0.39 | 0.24 |
| 500 | 3.23 | 0.80 | 0.47 |

This series of reactions also shows the increasing efficiency with increase in temperature. No ethylsilicon bonds were detected in the product.

Example 3

Mixtures of triisobutyl aluminum and each of the silanes shown below in the mol ratio of 0.394 isobutyl aluminum and 2.4 mols of the silane were each passed into a tube heated at 450° C. in a stream of helium. The contact time at 450° C. was about 1 second. The effluent gases were analyzed by vapor phased chromatography and the results are as shown in the table below.

| Silane reactant | Products in mols |
|---|---|
| Dimethyldichlorosilane | 0.3 dimethylchlorosilane and 0.45 dimethylsilane. |
| Phenyldimethylfluorosilane | 0.8 phenyldimethylsilane. |
| Phenyldimethylbromosilane | 0.5 phenyldimethylsilane. |
| Trimethyltertiarybutoxysilane | 0.9 trimethylsilane. |
| Phenylmethyldimethoxysilane | 0.3 phenylmethylsilane and 0.2 phenylmethylmethoxysilane. |
| Dimethylchloromethoxysilane | 0.38 dimethylsilane and 0.38 dimethylchlorosilane. |
| Allyltrichlorosilane | 0.4 propenyldichlorosilane and trace of propenylmonochlorosilane. |

Example 4

Equivalent results are obtained when the following silanes are substituted in the procedure of the example 3: diphenydichlorosilane, vinylmethyldichlorosilane, vinyltrichlorosilane, octylmethyldichlorosilane, dimethyldiethoxysilane, cyclohexyltrimethoxysilane, beta-phenylethylmethyldioctyloxysilane and tolylmethyldimethoxysilane.

Example 5

Equivalent results are obtained when the following alkyl aluminum compounds are used in the procedure of example 1:

diethyl aluminum isopropoxide
dibutyl aluminum chloride
propyl aluminum diethoxide.

That which is claimed is:

1. The method comprising heating a mixture of $R_nSiX_{4-n}$ and $R'_{3-z-m}AlH_zY_m$ at a temperature of at least 300° C. at substantially atmospheric pressure and removing the reaction product from the heated zone before substantial decomposition of the desired products are obtained, whereby reduction of at least one of the X groups occurs without alkylation of the silicon to give a silane of the formula $R_nSiH_bX_{4-n-b}$ in which R is a hydrocarbon radical of less than 10 carbon atoms, X is halogen or an alkoxy radical of less than 10 carbon atoms, R' is a lower alkyl group, of at least two carbon atoms, Y is a halogen or a lower alkoxy group, $n$ is an integer from 1 to 3, $z$ is an integer from 0 to 1, $m$ is an integer from 0 to 2 and $b$ is an integer from 1 to 3, the sum of $n+b$ being not greater than 4.

2. The method of claim 1 in which the reactants are dimethyldichlorosilane and diisobutyl aluminum hydride.

3. The process in accordance with claim 1 in which the reactants are dimethyldichlorosilane and triisobutyl aluminum.

4. The process in accordance with claim 1 in which the reactants are dimethyldichlorosilane and triethyl aluminum.

5. The process in accordance with claim 1 in which $m$ is 0 and $z$ is 1.

6. The process in accordance with claim 1 in which $m$ and $z$ are both 0.